United States Patent

Carlson

[15] 3,678,116

[45] July 18, 1972

[54] PROCESS FOR PREPARING A METHANO-POLY-CYCLIC HYDROQUINONE

[72] Inventor: Arthur W. Carlson, Crystal Lake, Ill.

[73] Assignee: Velsicol Chemical Corporation, Chicago, Ill.

[22] Filed: March 18, 1968

[21] Appl. No.: 714,023

[52] U.S. Cl..................260/619 F, 260/348 R, 260/396 R, 260/621 R
[51] Int. Cl.........................................C07c 37/00
[58] Field of Search..............................260/619 F, 621 R

[56] References Cited

UNITED STATES PATENTS

| | | | |
|---|---|---|---|
| 1,967,862 | 7/1934 | Carothers et al. | 260/619 X |
| 2,584,140 | 2/1952 | Segel et al. | 260/619 X |
| 2,886,577 | 5/1959 | Yun Fan | 260/619 X |

*Primary Examiner*—Leon Zitver
*Assistant Examiner*—Norman Morgenstein
*Attorney*—Robert J. Schwarz

[57] ABSTRACT

A process for preparing a methano-polycyclic hydroquinone which comprises rearranging a corresponding methano-polycyclic quinone under isomerization conditions in the presence of an inert solvent and water and thereafter recovering the desired hydroquinone product.

9 Claims, No Drawings

PROCESS FOR PREPARING A METHANO-POLY-CYCLIC HYDROQUINONE

This invention relates to a process for preparing hydroquinones and, more specifically, relates to the preparation of methano-polycyclic hydroquinones by the rearrangement of corresponding quinones.

Methano-polycyclic hydroquinones, such as 5,6,7,8,9,9-hexachloro-5,8-methano-5,8-dihydro-1,4-naphthohydroquinone, are valuable industrial chemicals having a variety of different applications, such as insecticides or flame retardants for polymer systems, for example polyesters. These hydroquinones are also valuable as intermediates in the preparation of other valuable compounds, such as 2,3-epoxy propoxy derivatives obtained by reacting the hydroquinone with an epihalohydrin. These hydroquinones are usually prepared by first forming a corresponding methano polycyclic quinone by reacting a quinone or a naphthoquinone with a cyclic diolefin, such as a cyclopentadiene under Diels-Alder conditions. The quinone adduct thus formed is then converted or rearranged to the desired hydroquinone under isomerization conditions in the presence of a solvent and a catalyst, such as a basic material, for example, pyridine or sodium hydroxide, or an acidic material, for example, sulphuric acid. This rearrangement step of the preparation is not particularly satisfactory, however, and suffers from a number of disadvantages. The presence of a catalytic material frequently adversely affects the hydroquinone product. For example, the employment of a basic catalyst such as caustic causes a significant development of initial color requiring a decolorizing carbon to give a color free product and the use of an acidic catalyst such as p-toluene sulfonic acid causes a later development of color rendering the product commercially undesirable. Moreover, extensive purification of the hydroquinone product is usually required, especially when it is to be further reacted, because the catalytic materials have a high affinity for the quinone product and are not readily removed by simple purification techniques.

An object of this invention, therefore, is to provide an improved process for preparing methano-polycyclic hydroquinones utilizing the rearrangement of corresponding methano-polycyclic quinones. Another object is to avoid the employment of basic or acidic catalytic materials for the rearrangement. A further object is to effect the rearrangement with the obtainment of high conversion of the quinone to the desired hydroquinone and, moreover, in a particularly desirable industrial manner. These and other objects of this invention will be apparent from the following detailed description thereof.

The objects of this invention are realized by effecting the rearrangement or conversion of a methano-polycyclic quinone to its corresponding hydroquinone in the presence of water and an inert solvent under isomerization conditions. Utilization of this procedure avoids the necessity of an added catalytic material for the rearrangement with its associated disadvantages. Moreover, employment of water to effect the rearrangement achieves high conversions of the quinone to the desired hydroquinone and permits the hydroquinone product to be readily recovered in a highly pure state free of catalyst contamination.

The rearrangement of a methano-polycyclic quinone to its corresponding hydroquinone can be represented by the following equations illustrating the rearrangement of a methanonaphthoquinone and a methano-anthroquinone, respectively:

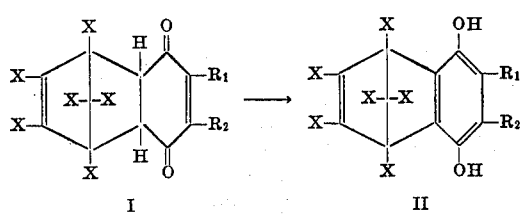

I  II

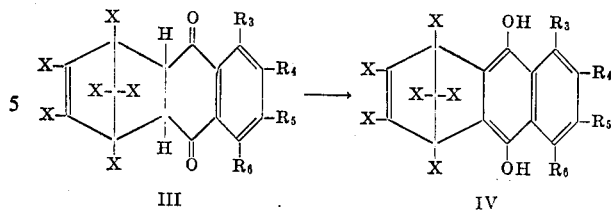

III  IV where X is selected from the group consisting of hydrogen and $R_1$, $R_2$, $R_3$, $R_4$, $R_5$ and $R_6$ are independently selected from the group consisting of hydrogen, a halogen, aryl and an aliphatic radical.

The methano-polycyclic quinones of the above formulas I and III represent quinones which can be suitably rearranged according to the process of this invention in the presence of water and an inert solvent while the methano-polycyclic hydroquinones of formulas II and IV represent the hydroquinone products obtained. In general, a wide group of different methano-polycyclic quinones can be rearranged to the corresponding hydroquinones. For example, in the above formulas, X can be hydrogen or a halogen such as chlorine or bromine, and $R_1$, $R_2$, $R_3$, $R_4$, $R_5$ and $R_6$, individually, can be hydrogen; a halogen such as chlorine or bromine; aryl, such as phenyl or substituted phenyl; or an aliphatic radical, such as alkyl or alkenyl having from one to about 10 carbon atoms. Typical examples of the quinones of formulas I and III include such compounds as:

5,8-methano-5,8-dihydro-1,4-naphthoquinone,
5,8-methano-5,8-dihydro-2-methyl-1,4-naphthoquinone,
5,8-methano-5,8-dihydro-2,3-diallyl-1,4-naphthoquinone,
5,8-methano-5,8-dihydro-2,3-dichloro-1,4-naphthoquinone,
5,8-methano-5,8-dihydro-2,3-dimethyl-1,4-naphthoquinone,
5,8-methano-5,8-dihydro-2-ethyl-1,4-naphthoquinone,
5,6,7,8-tetrachloro-5,8-methano-5,8-dihydro-1,4-naphthoquinone,
5,6,7,8,9,9-hexachloro-5,8-methano-5,8-dihydro-1,4-naphthoquinone,
5,6,7,8,9,9-hexabromo-5,8-methano-5,8-dihydro-1,4-naphthoquinone,
5,6,7,8,9,9-hexachloro-5,8-methano-5,8-dihydro-2-methyl-1,4-naphthoquinone,
2,3,5,6,7,8,9,9-octachloro-5,8-methano-5,8-dihydro-1,4-naphthoquinone,
5,8-methano-5,8-dihydro-9,10-anthroquinone, or
5,6,7,8,11,11-hexachloro-5,8-methano-5,8-dihydro-9,10-anthroquinone.

Of the various methano-polycyclic quinones which can be rearranged to the corresponding hydroquinones, the quinones which are most effectively rearranged and which constitute the preferred starting material for use in the process of this invention are the polyhalogenated methano-naphthoquinones represented by formula I above where X is a halogen such as chlorine. The methano-polycyclic hydroquinone products of the rearrangement represented by the formulas II and IV above correspond to the above illustrated quinones and typical illustrated hydroquinones include:

5,8-methano-5,8-dihydro-1,4-naphthohydroquinone,
5,8-methano-5,8-dihydro-2-methyl-1,4-naphthohydroquinone,
5,8-methano-5,8-dihydro-2,3-diallyl-1,4-naphthohydroquinone,
5,8-methano-5,8-dihydro-2,3-dichloro-1,4-naphthohydroquinone,
5,8-methano-5,8-dihydro-2,3-dimethyl-1,4-naphthohydroquinone,
5,8-methano-5,8-dihydro-2-ethyl-1,4-naphthohydroquinone,
5,6,7,8-tetrachloro-5,8-methano-5,8-dihydro-1,4-naphthohydroquinone, 5,6,7,8,9,9-hexachloro-5,8-methano-5,8-dihydro-1,4-naphthohydroquinone, 5,6,7,8,9,9-hexabromo-5,8-methano-5,8-dihydro-1,4-naphthohydroquinone, 5,6,7,8,9,9-hexachloro-5,8-methano-5,8-dihydro-2-methyl-1,4-naphthohydroquinone, 2,3,5,6,7,8,9,9-octachloro-5,8-methano-5,8-dihydro-1,4-naphthohydroquinone, 5,8-methano-5,8-dihydro-9,10-anthrohydroquinone, or 5,6,7,8,11,11-hexachloro-5,8-methano-5,8-dihydro-9,10-anthrohydroquinone. While the methano-polycyclic quinones and hydroquinones are described herein for purposes of simplicity as quinones or hydroquinones, they can also be described by other nomenclature systems. For example, 5,8-methano-5,8-dihydro-1,4-naphthoquinone can also be described as 5,8-methano-4$_a$,5,8,8$_a$-tetrahydronaphthalenedione-1,4 and 5,8-methano-5,8-dihydro-1,4-naphthohydroquinone can be described as 5,8-methano-1,4-dihydroxy-4$_a$,5,8,8$_a$-tetrahydronaphthalene.

The solvents which can be used with water to effect the rearrangement can include a wide variety of different materials. In general, most solvents which are inert to the quinone starting material and the hydroquinone product, capable of forming a substantially homogeneous solution of the quinone, hydroquinone and water at moderately elevated temperatures and which permits the hydroquinone to crystallize out at moderately low temperatures can be utilized. Typically, the solvent is an organic material and includes such solvents as alcohols, for example, methyl alcohol, ethyl alcohol, or isopropyl alcohol; nitriles such as acetonitrile; ethers such as methyl or ethyl diethers; or ketones such as acetone or methyl ethyl ketone as well as various combinations thereof. Of the many solvents which can be used, alcohols and especially lower alkanols having from one to about five carbon atoms, such as methyl alcohol, are preferred. The quantity of the solvent employed can be varied with the optimum quantity being a function of the particular solvent or combination of solvents, the quinone undergoing rearrangement as well as the isomerization conditions of temperature and pressure employed. Typically, however, when using solvents such as methanol, the quantity employed can range from about 1 to about 15 weight parts of solvent per 1 weight part of the quinone undergoing rearrangement with from about 2.5 to about 12 weight parts of solvent per 1 weight part of the quinone usually being preferred.

The quantity of the water used in combination with the above described solvents can also be widely varied with the particular optimum quantity selected to maximize conversion to the desired hydroquinone being dependent upon similar factors such as the type and quantity of the solvent and the particular quinone undergoing rearrangement. Usually, however, the amount of water can range from about 0.10 to about 2.0 weight parts of water per 1 weight part of the quinone with a more limited range of from about 0.20 to about 1.25 weight parts of water per 1 weight part of the quinone being preferred, especially when employing a preferred solvent such as methanol within the aforementioned ranges.

The isomerization conditions of temperature and pressure utilized to effect the rearrangement can vary and are interrelated to the solvent, its quantity and the amount of water used, as well as the particular quinone undergoing rearrangement. Usually, the temperature can range from about 25° to about 200° C. with a more limited range of from about 50° to about 125° C. usually being preferred. An especially preferred and convenient operating temperature, however, is the refluxing temperature of the reaction mixture which will vary within the above ranges depending upon such factors as the solvent or solvent mixture, the quantity of the water present and the pressure. While the rearrangement can be effectively conducted at the above temperature ranges at atmospheric pressure, it may be desirable in certain instances, especially to increase conversion, to operate at an elevated pressure ranging from about 1 to about 4 atmospheres above atmospheric pressure. The duration of the rearrangement or the period of time necessary to achieve the desired conversion effected under such isomerization conditions will vary but usually ranges from about 1 to about 15 hours.

After the desired degree of conversion has been achieved, the methano-polycyclic hydroquinone product can be readily recovered from the reaction mixture by simply cooling to crystallize the product which can then be readily recovered by conventional filtration techniques. This, of course, avoids the more complicated recovery procedures required when the rearrangement is effected in the presence of a catalytic material. If desired, the hydroquinone product can then be further purified to an extremely pure state according to conventional techniques such as crystallization.

The rearrangement process of this invention can be effected in either a batch or continuous type operation. A batch operation is usually preferred, however, and an illustrative procedure involves charging the appropriate quantities of the quinone to be rearranged, for example 5,6,7,8,9,9-hexachloro-5,8-methano-5,8-dihydro-1,4-naphthoquinone, the desired solvent, such as methyl alcohol, and water to a reaction vessel. The reaction mixture is then heated, preferably to reflux temperature, and maintained thereat for a period of time necessary to effect the desired conversion. The mixture is then cooled to crystallize the product which can then be separated from the reaction mixture by filtration, washed and, if necessary, recrystallized to yield a highly pure hydroquinone product which in this illustration is 5,6,7,8,9,9-hexachloro-5,8-methano-5,8-dihydro-1,4-naphthohydroquinone.

The following examples are offered to illustrate the process of this invention but they are not intended to limit the invention to the particular methano-polycyclic quinone undergoing rearrangement or to the specific rearrangement conditions illustrated.

EXAMPLE 1

The process of this invention was used to prepare a methano-polycyclic hydroquinone from the corresponding quinone according to the following procedure of Part A. The same procedure was used in Part B, but water was not present during the rearrangement according to this invention.

PART A 5,6,7,8,9,9-hexachloro-5,8-methano-5,8-dihydro-1,4-naphthoquinone 5 grams, methyl alcohol 44 grams and water 5 grams were charged to a reaction flask equipped with an overhead reflux column. The mixture was heated to reflux (68° to 71°C.) and maintained thereat for 3 hours. The mixture was then cooled and analysis by infrared spectroscopy indicated conversion of 99 percent to the desired 5,6,7,8,9,9-hexachloro-5,8-methano-5,8-dihydro-1,4-naphthohydroquinone.

PART B

Using the same general procedure of Part A, 5 grams of the same quinone and methyl alcohol, 48 grams, were heated at reflux for 3 hours. The conversion to the desired hydroquinone product was 21 percent.

EXAMPLE 2

Using the general procedure of Example 1, 5,6,7,8,9,9-hexachloro-5,8-methano-5,8-dihydro-1,4-naphthohydroquinone was prepared by heating the corresponding quinone, 5 grams, water, 5 grams, and methyl ethyl ketone, 32.2 grams, at reflux (76°C.) for 1 hour. The conversion to the desired hydroquinone product was 90 percent.

EXAMPLE 3

Using the general procedure of Example 1, 5,6,7,8,11,11-hexachloro-5,8-dihydro-5,8-dimethano-9,10-anthroquinone is prepared by heating at reflux 5,6,7,8,11,11-hexachloro-5,8-dihydro-5,8-dimethano-9,10-anthroquinone 5 grams, water 5 grams and methyl alcohol 50 grams.

EXAMPLE 4

Using the general procedure of Example 1, 5,8-methano-5,8-dihydro81,4-naphthohydroquinone is prepared by heating at reflux, 5,8-methano-5,8-dihydro-1,4-naphthoquinone, 5 grams, water, 5 grams, and methyl alcohol, 50 grams.

EXAMPLE 5

Using the general procedure of Example 1, 5,6,7,8,9,9-hexachloro-5,8-methano-5,8-dihydro-1,4-naphthohydroquinone was prepared by heating 5,6,7,8,9,9-hexachloro-5,8-methano-5,8-dihydro-1,4-naphthoquinone, 150 grams, water 70 grams and methyl alcohol, 560 grams, at reflux for about 9 hours. With the limited amount of solvent used, only about one-half of the quinone initially dissolved with the remainder dissolving as the reaction proceeded. The conversion to the desired hydroquinone product was 80 percent.

I claim:

1. A process for preparing a methano-polycylic hydroquinone selected from

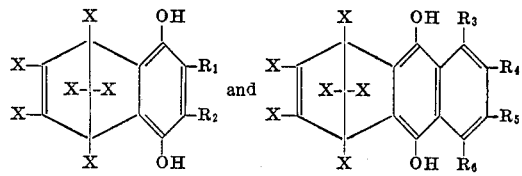

where X is selected from the group consisting of hydrogen, chlorine and bromine; $R_1$ and $R_2$ are independently selected from the group consisting of chlorine, bromine, lower alkyl, lower alkenyl and hydrogen; $R_3$, $R_4$, $R_5$ and $R_6$ are selected from the group consisting of chlorine, bromine and hydrogen which comprises rearranging a corresponding methano-polycyclic quinone under isomerization conditions in the presence of an alkanol containing one to five carbon atoms as an inert solvent and water at a temperature from about 25° to about 200° C. and thereafter recovering the desired hydroquinone product.

2. The process of claim 1 wherein the solvent is present in an amount of from about 0.5 to 15 weight parts per 1 weight part of the quinone.

3. The process of claim 1 wherein the water is present in an amount of from about 0.10 to about 2.0 weight parts per 1 weight part of the quinone.

4. The process of claim 1 wherein 5,6,7,8,9,9-hexachloro-5,8-methano-5,8-dihydro-1,4-naphthohydroquinone is produced by rearranging 5,6,7,8,9,9-hexachloro-5,8-methano-5,8-dihydro-1,4-naphthoquinone.

5. The process of claim 1 wherein 5,6,7,8,9,9-hexachloro-5,8-methano-5,8-dihydro-1,4-naphthohydroquinone is prepared by rearranging 5,6,7,8,9,9-hexachloro-5,8-methano-5,8-dihydro-1,4-naphthoquinone at a temperature within the range of from about 25° to about 200° C. in the presence of from about 0.5 to about 15 weight parts of solvent per 1 weight part of the quinone and from about 0.10 to about 2.0 weight parts of water per 1 weight part of the quinone.

6. The process according to claim 5 wherein the temperature is from about 50° to about 90° C.

7. The process according to claim 5 wherein the solvent is present in an amount of from about 2.5 to about 12 weight parts per 1 weight part of the quinone.

8. The process of claim 5 wherein the water is present in an amount of from about 0.20 to about 1.25 weight parts per 1 weight part of the quinone.

9. The process of claim 5 wherein the solvent is methyl alcohol.

* * * * *